United States Patent
Jobe

(10) Patent No.: US 9,505,333 B2
(45) Date of Patent: Nov. 29, 2016

(54) MOTORCYCLE RACK FOR A PICKUP TRUCK

(71) Applicant: Tracy Hutch Jobe, Bixby, OK (US)

(72) Inventor: Tracy Hutch Jobe, Bixby, OK (US)

(*) Notice: Subject to any disclaimer, the term of this patent is extended or adjusted under 35 U.S.C. 154(b) by 126 days.

(21) Appl. No.: 14/278,495

(22) Filed: May 15, 2014

(65) Prior Publication Data

US 2015/0329059 A1 Nov. 19, 2015

(51) Int. Cl.
*B60R 7/00* (2006.01)
*B60R 9/00* (2006.01)
*B60P 3/077* (2006.01)
*B60R 9/10* (2006.01)
*B60R 9/06* (2006.01)

(52) U.S. Cl.
CPC .............. *B60P 3/077* (2013.01); *B60R 9/00* (2013.01); *B60R 9/06* (2013.01); *B60R 9/10* (2013.01)

(58) Field of Classification Search
CPC ............. B60R 9/00; B60R 9/10; B60P 3/40; B60P 3/07
USPC .......................... 224/405, 403, 534
See application file for complete search history.

(56) References Cited

U.S. PATENT DOCUMENTS

| | | | |
|---|---|---|---|
| 3,785,517 A | 1/1974 | Brajkovich | |
| 5,092,504 A | 3/1992 | Hannes et al. | |
| 5,127,564 A | 7/1992 | Romero | |
| 5,211,376 A * | 5/1993 | Anderson | B66F 3/12 254/134 |
| 5,301,817 A * | 4/1994 | Merritt | A47F 7/04 211/20 |
| 5,988,402 A * | 11/1999 | Mayfield | B62H 3/04 211/20 |
| 6,010,287 A | 1/2000 | Sommermeyer et al. | |
| 6,179,181 B1 | 1/2001 | Johnson et al. | |
| 6,331,094 B1 | 12/2001 | Burrows | |
| 6,679,408 B1 * | 1/2004 | Thomas | B60P 3/075 224/403 |
| 7,014,398 B1 | 3/2006 | Hellwig | |
| 7,044,309 B2 * | 5/2006 | Raines | B60P 3/077 211/17 |
| 7,051,909 B2 | 5/2006 | Gibson | |
| 7,150,359 B1 * | 12/2006 | Lyons | B62H 3/08 211/20 |
| 7,416,373 B2 | 8/2008 | Mock | |
| 7,641,086 B2 | 1/2010 | Green | |
| 8,104,588 B2 * | 1/2012 | Curlee | B62H 3/08 188/32 |
| 2006/0108297 A1 * | 5/2006 | Gay | B62H 3/04 211/20 |
| 2006/0196906 A1 | 9/2006 | Gibson, Jr. | |
| 2007/0246496 A1 * | 10/2007 | Reeves | B60R 9/10 224/403 |
| 2013/0277404 A1 * | 10/2013 | Heininger | B60R 9/10 224/405 |

FOREIGN PATENT DOCUMENTS

CN 201989692 9/2011

* cited by examiner

*Primary Examiner* — Justin Larson
*Assistant Examiner* — Lester L Vanterpool
(74) *Attorney, Agent, or Firm* — Crowe & Dunlevy, P.C.

(57) ABSTRACT

The invention is generally directed to a motorcycle rack for a pickup truck. The motorcycle rack includes a frame with a long, narrow slot for receipt of a generally horizontal tongue of a curved wheel wedge. The frame is removably installed in the truck bed by anchoring fasteners on opposing sides of the frame to provide proper fit in the truck bed. The slot has a plurality of spaced apertures to allow for optional positioning of the wheel wedge. The tongue of the wheel wedge is slidably secured within the slot to distribute the weight of the motorcycle laterally across the width of the truck bed. The tire of the motorcycle is held by the wheel wedge, and can be secured by strap(s) and clip(s) attached to the motorcycle rack.

19 Claims, 4 Drawing Sheets

MOTORCYCLE RACK FOR A PICKUP TRUCK

CROSS REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

BACKGROUND OF THE INVENTION

1. Field of the Invention

The invention relates to a motorcycle rack for a pickup truck, and more particularly to a motorcycle rack having a frame with a long, narrow slot for receipt of a tongue of a curved wheel wedge.

2. Description of the Related Art

Many people enjoy taking their motorcycles to remote areas for riding on trails or otherwise participate in motor sport activities. Hauling motorcycles has never been a particularly simple or easy task, and after a long day of riding or racing, riders are going to be tired, dirty, hungry, thirsty, and possibly hurt, the last thing they want is difficulty loading their cycle in the pickup. To prevent damaging the motorcycle, the motorcycle must be lashed down or otherwise secured to the pickup truck bed during transit to the riding area. Frequently, more than one motorcycle is transported in the truck and each cycle must be secured so that they are not damaged by the drive and do not damage the other motorcycle or the pickup. Unfortunately, devices for supporting the motorcycle in the bed of the pickup truck typically have included simple ropes or straps which make the transport of the motorcycle a risky undertaking. Not only is the installation of such straps and other similar devices time-consuming to secure upon the front wheel of a cycle, these straps typically rely on compressing the motorcycle's front fork in order to secure the motorcycle, which places unwanted stress upon the front fork of the motorcycle.

It is therefore desirable to provide an improved motorcycle rack for a pickup truck or trailer.

It is further desirable to provide a motorcycle rack having a frame with a long, narrow slot for receipt of a generally horizontal tongue of a curved wheel wedge.

It is still further desirable to provide a motorcycle rack having a curved wheel wedge that makes contact throughout a 180 degree arc with the tire of the motorcycle.

It is yet further desirable to provide a motorcycle rack having a curved wheel wedge with extended lower lateral tire supports for proper tracking and alignment of the tire before the tire enters into the curved wheel wedge to ease loading/unloading.

It is still yet further desirable to provide a motorcycle rack having a curved wheel wedge with lateral tire supports being spaced in parallel to provide a constant snug, secure, stable, and supportive stance for the motorcycle without the need for adjustment.

It is still yet further desirable to provide a motorcycle rack having a curved wheel wedge with a generally horizontal tongue received in a long, narrow slot of a frame to distribute the weight of the motorcycle laterally across the width of the truck bed, thereby optimizing stability and security of the motorcycle.

It is still yet further desirable to provide a motorcycle rack having a frame with a long, narrow slot for receipt of a tongue of a curved wheel wedge that is solid, stable, and secure, and when securing straps are threaded through the front wheel and attached to standard clips of the pickup bed, adds integrity, stability, and secureness.

It is still yet further desirable to provide a motorcycle rack constructed of a resilient, lightweight, non-rusting material, such as aluminum.

It is still yet further desirable to provide a motorcycle rack that can be rapidly installed and dismantled from a pickup bed by a single person.

It is still yet further desirable to provide a motorcycle rack having a slim design that takes up very little truck bed space in order to maintain maximum utility of the pickup truck bed while the motorcycle rack is installed.

BRIEF SUMMARY OF THE INVENTION

In general, in a first aspect, the invention relates to a motorcycle rack for a pickup truck. The motorcycle rack includes a frame having a long, narrow slot with a plurality of spaced pin apertures for receipt of a fastening pin. The motorcycle rack also includes a curved wheel wedge having a tongue. The wheel wedge has lateral tire supports with elongated lower ends. The tongue of the curved wheel wedge is adjustably secured within the slot of the frame to distribute the weight of the motorcycle laterally across the width of the pickup truck.

The motorcycle rack can further include the slot formed between an upper cross-member and a lower cross-member aligned in a parallel and spaced relation. The cross-members may have a plurality of axially aligned pin apertures, such as a right set of pin apertures, a center set of pin apertures and a left set of pin apertures. In addition, the frame can include generally inverted L-shaped upright supports attached to opposing terminal ends of the slot. Each of the upright supports may have an elongate fastener aperture through which a fastener is passed and secured to an anchor sleeve. The frame may also include a generally U-shaped lower support attached to a lower cross-member intermediate of upright supports attached to opposing terminal ends of the slot. The lower support can have a pair of adjustable tie-down straps with carabiners.

The motorcycle rack can also include the tire supports of the curved wheel wedge having a plurality of spaced cross-members to maintain the curved wheel wedge in a consistent arc. The tongue of the wheel wedge may be generally horizontal and aligned perpendicular to the wheel wedge. The tongue can have a plurality of pin apertures, and the tongue may be attached to a middle section of the curved wheel wedge.

In general, in a second aspect, the invention relates to a motorcycle rack having a frame and a curved wheel wedge. The frame includes an upper cross-member and a lower cross-member forming a long, narrow slot there between.

The upper cross-member and the lower cross-member have a plurality of axially aligned pin apertures for receipt of a fastening pin. The frame also includes generally upright supports attached to terminal ends of the upper cross-member and the lower-cross member. The curved wheel wedge includes a pair of spaced lateral tire supports having extended lower ends. The curved wheel wedge also includes a tongue attached to a middle section of the tire supports. The tongue is generally horizontal to and generally perpendicular with the lateral tire supports, and includes a plurality of pin apertures for receipt of the fastening pin. The tongue of the curved wheel wedge is adjustably received within the slot of the frame.

The motorcycle rack can further include the upper cross-member and the lower cross-member being aligned in a parallel and spaced relation. The pin apertures in the upper cross-member and the lower cross-member may be a right set of pin apertures, a center set of pin apertures and a left set of pin apertures. The upright supports may be generally inverted L-shaped upright supports attached to opposing terminal ends of the slot. Moreover, each of the upright supports can include an elongate fastener aperture through which a fastener is passed and secured to an anchor sleeve. The frame can have a generally U-shaped lower support attached to the lower cross-member intermediate of the upright supports, with the lower support having a pair of adjustable tie-down straps with carabiners.

Figure 1:
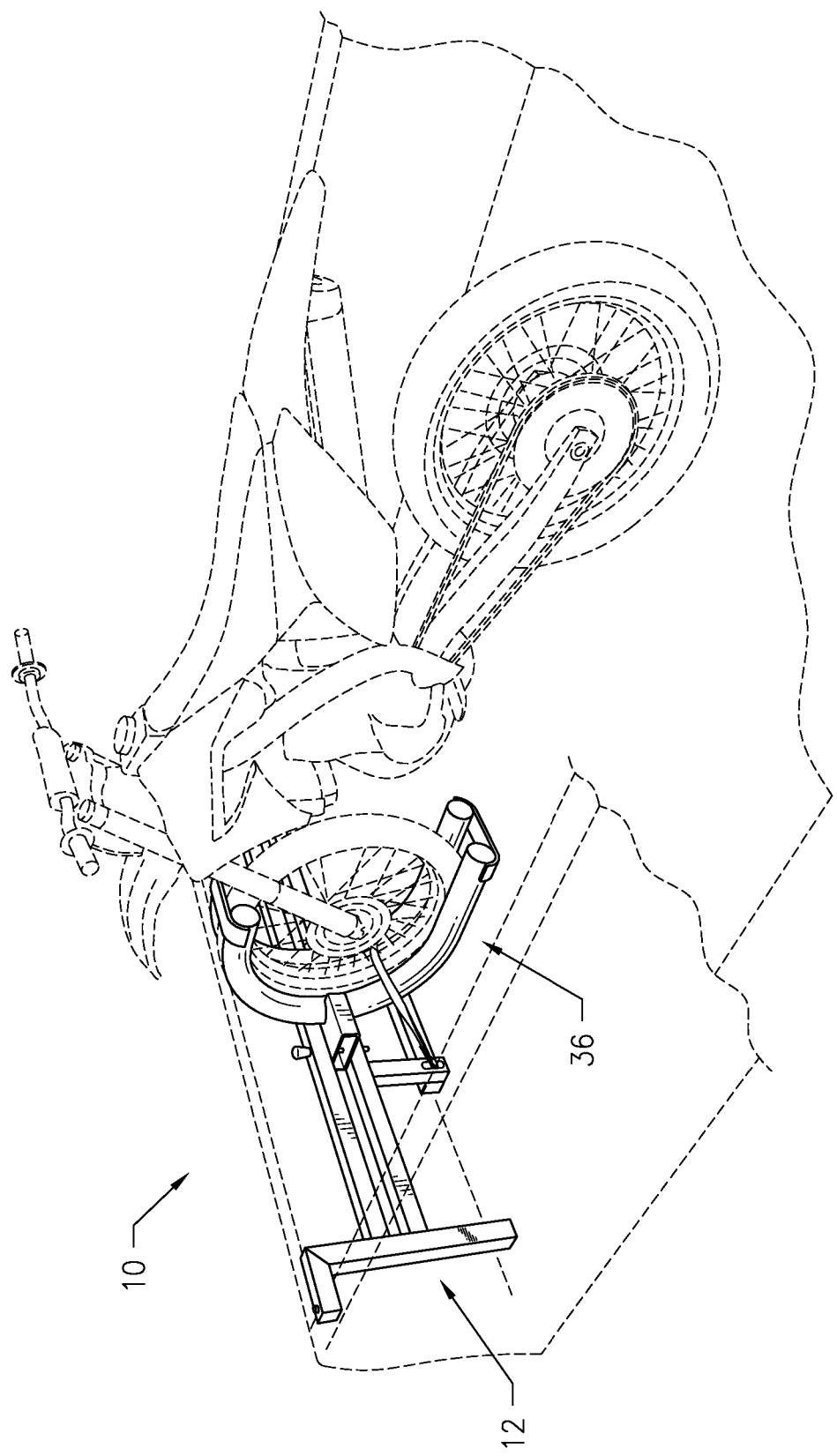
FIG. 1 is a perspective view of a motorcycle rack removably installed in the bed of a pickup truck in accordance with an illustrative embodiment of the invention disclosed herein.
Figure 2:
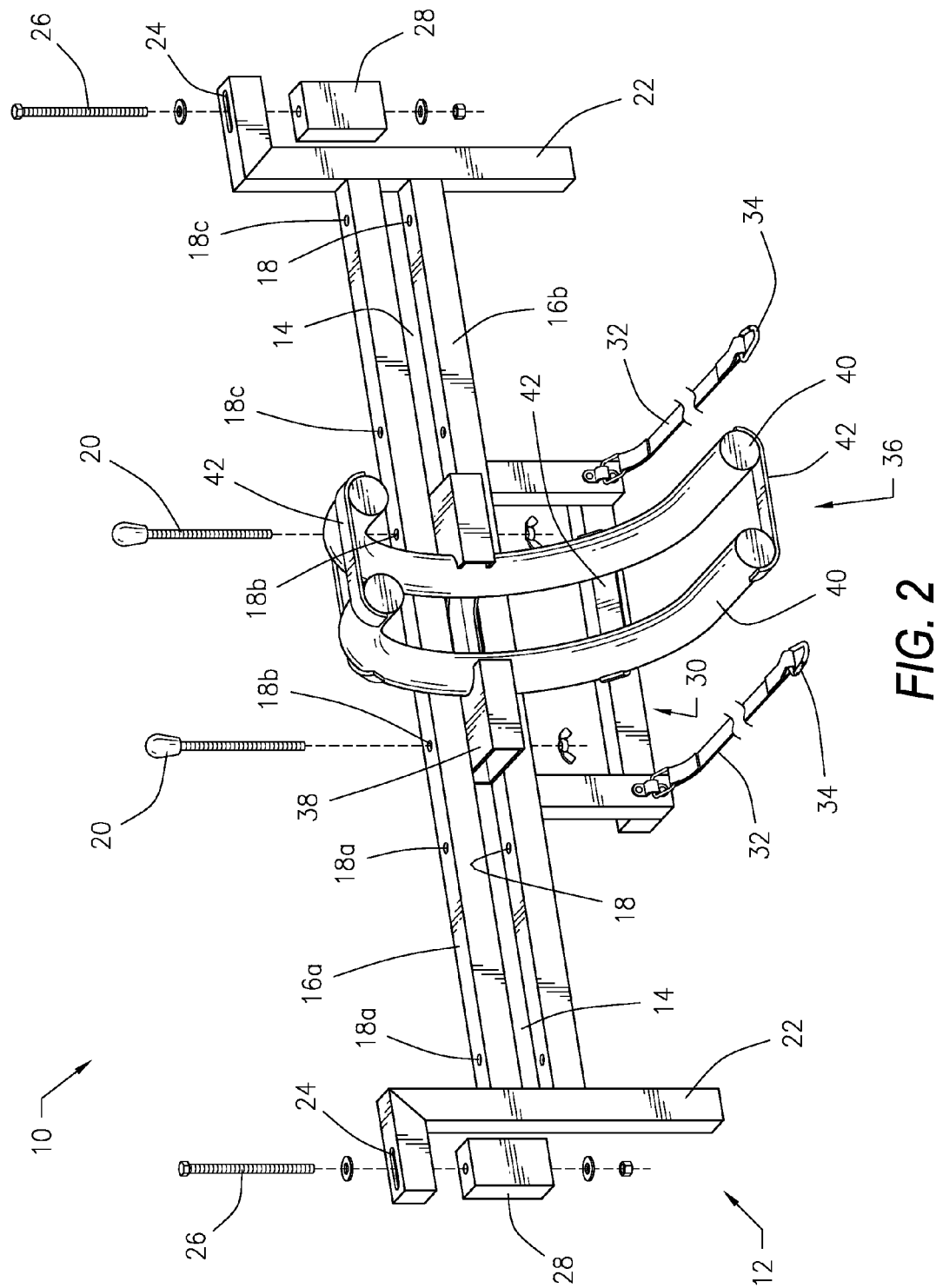
FIG. 2 is a perspective, partially exploded view of the motorcycle rack shown in FIG. 1.
Figure 3:
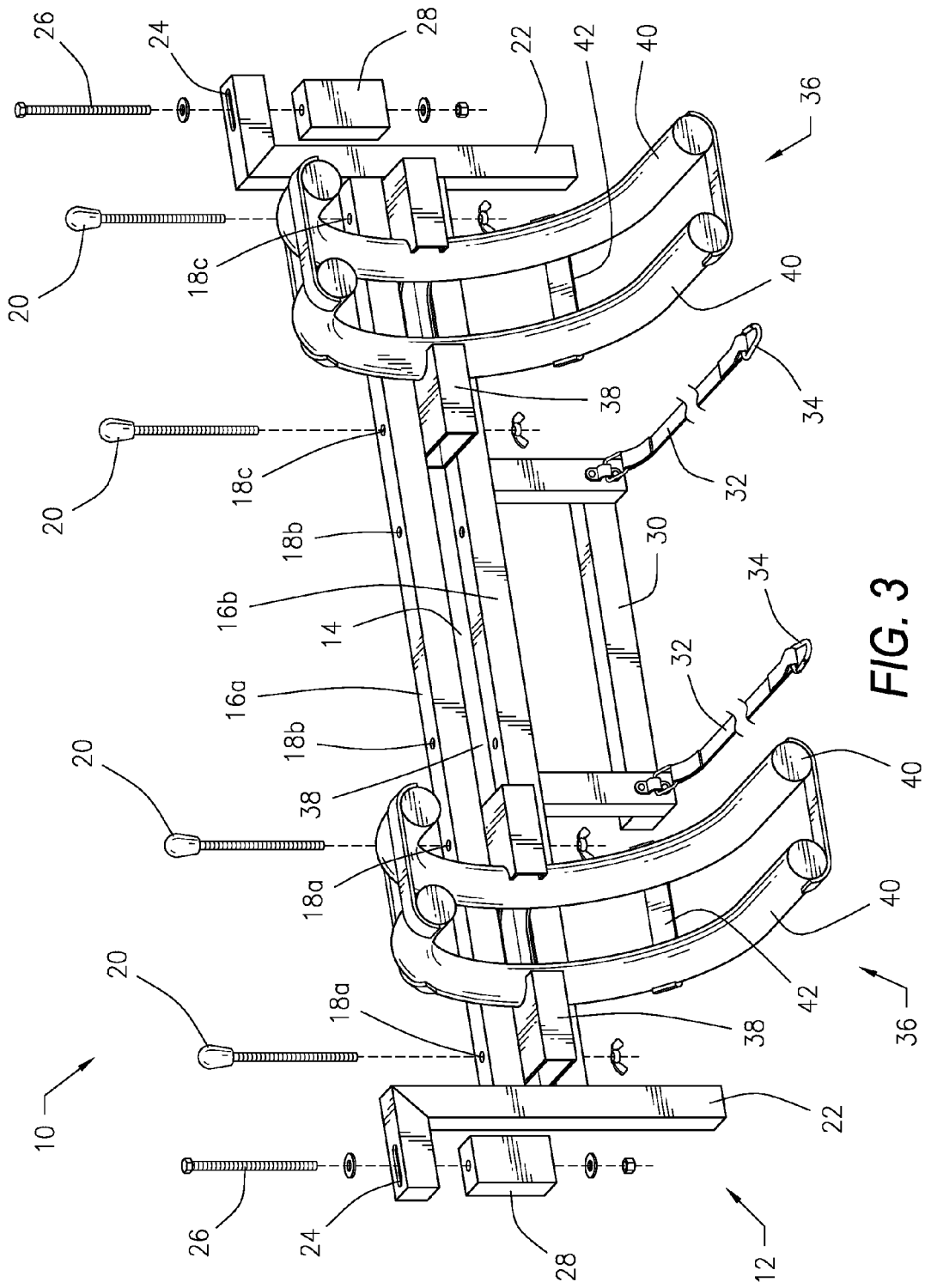
FIG. 3 is a perspective, partially exploded view of a motorcycle rack with two (2) curved wheel wedges in accordance with another illustrative embodiment of the invention disclosed herein.
Figure 4:
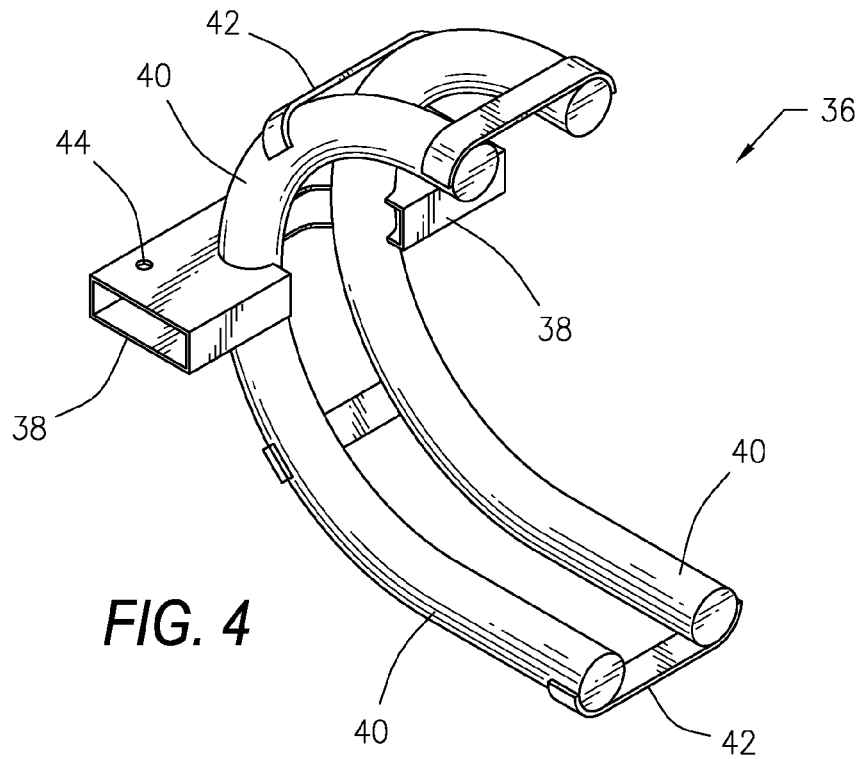
FIG. 4 is a perspective view of an example of a curved wheel wedge in accordance with an illustrative embodiment of the motorcycle rack disclosed herein.
Figure 5:
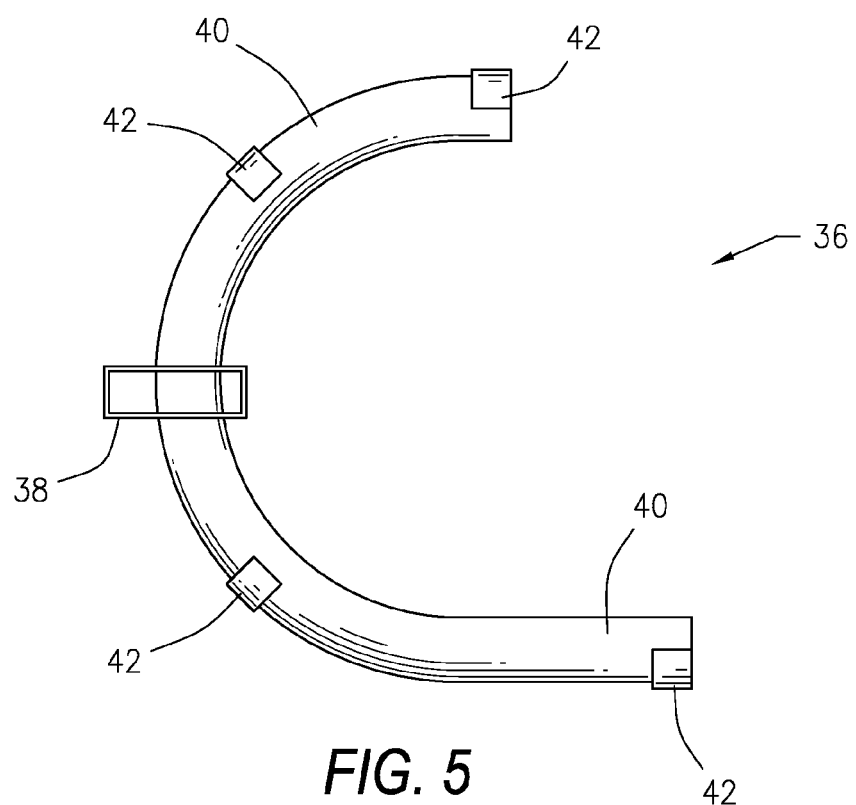
FIG. 5 is a side elevation view of the curved wheel wedge shown in FIG. 4.

Other advantages and features of the invention will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Referring to the figures of the drawings, wherein like numerals of reference designate like elements throughout the several views, and initially to FIG. 1, a motorcycle rack 10 for a pickup truck or trailer. The motorcycle rack 10 includes a frame 12 with a long, narrow slot 14 formed between an upper cross-member 16a and a lower cross-member 16b aligned in a parallel and spaced relation. The cross-members 16a/b include a plurality of axially aligned pin apertures 18 for receipt of fastening pins 20. In particular, the cross-members 16a/b include a right set of pin apertures 18a, a center set of pin apertures 18b and a left set of pin apertures 18c. The frame 12 also includes generally inverted L-shaped upright supports 22 attached to opposing terminal ends of the cross-members 16a/b. Each of the upright supports 22 includes an elongate fastener aperture 24 through which a fastener 26 is passed and secured to an anchor sleeve 28. The anchor sleeves 28 are configured and sized to fit within stake holes (not shown) in the bed of the pickup truck, and may be constructed of any suitable resilient, lightweight, non-rusting material, such as wood or aluminum. The elongate fastener apertures 24 in the upright supports 22 allow proper sizing and fit of the motorcycle rack 10 in any sized pickup bed. In addition, the frame 12 includes a generally U-shaped lower support 30 attached to the lower cross-member 16b intermediate of the upright supports 22. The lower support 30 includes a pair of adjustable tie-down straps 32 with carabiners 34. During use, the tie-down straps 32 can be woven through the front tire with the straps 32 and climbing-style carabiner clips 34 providing for additional securing of the motorcycle to the frame 12 of the motorcycle rack 10.

In addition to the frame 12, the motorcycle rack 10 includes a curved wheel wedge 36 having a tongue 38 attached to a middle section of the curved wheel wedge 36. The wheel wedge 36 includes a pair of lateral tire supports 40 with extended, elongated lower ends for proper tracking and alignment of the motorcycle tire before it enters into the curved wheel wedge 36. The curved wheel wedge 36 is constructed to make contact throughout a 180 degree arc with the tire and to have a precise circumference and width of the tire providing a snug, tight, and supportive upright stance for the motorcycle. The tire supports 40 of the curved wheel wedge 36 include a plurality of spaced cross-members 42 to maintain the curved wheel wedge 36 in a consistent arc. The tongue 38 of the wheel wedge 36 is aligned generally horizontal with and perpendicular to the lateral tire supports 40, and includes pin apertures 44 capable of alignment with the pin apertures 18 in the frame 12. The tongue 38 is configured to be received within the slot 14 of the frame 12 of the motorcycle rack 10, which distributes the weight of the motorcycle laterally across the width of the truck bed optimizing stability and security. The curved wheel wedge 36 may be positioned and secured to a left position, a center position or a right position, and/or the motorcycle rack 10 may include up to three (3) curved wheel wedges 36 in order to hold up to three (3) motorcycles.

Moreover, the motorcycle rack 10 can include adequate padding on all surfaces of the frame 12 and/or the wheel wedge 36 assuring minimal to no abrasion at contact points with the pickup truck.

Whereas, the invention has been described in relation to the drawings and claims, it should be understood that other and further modifications, apart from those shown or suggested herein, may be made within the scope of this invention.

What is claimed is:

1. A motorcycle rack for a pickup truck, said motorcycle rack comprising:
   a frame having a long, narrow slot, said slot formed between an upper cross-member and a lower cross-member aligned in a parallel and spaced relation, said frame having a plurality of spaced pin apertures for receipt of a fastening pin; and
   a curved wheel wedge having a tongue, said wheel wedge having a first lateral tire support aligned in a parallel and fixed spaced relation to a second lateral tire support, said first lateral tire support and said second lateral tire support being generally C-shaped with elongate, horizontally extending lower ends, said tongue of said curved wheel wedge adjustably secured intermediate of said upper cross-member and said lower cross-member within said slot of said frame to distribute the weight of the motorcycle laterally across the width of the frame, said tongue adjustably received within said slot of said frame intermediate of said upper cross-member and said lower cross-member, said tongue having an upper surface engaged with said lower surface of said upper cross-member, and said tongue having a lower surface engaged with said upper surface of said lower cross-member.

2. The motorcycle rack of claim 1 wherein said upper cross-member and said lower cross-member have a plurality of axially aligned pin apertures.

3. The motorcycle rack of claim 2 wherein said pin apertures further comprise a right set of pin apertures, a center set of pin apertures and a left set of pin apertures.

4. The motorcycle rack of claim 1 wherein said frame further comprises inverted L-shaped upright supports, said upright supports comprising vertical support members having an upper terminal cantilevered support member, said vertical support members attached to opposing terminal ends of said slot.

5. The motorcycle rack of claim 4 wherein each of said cantilevered support members of said upright supports includes an elongate fastener aperture through which a fastener is vertically passed and secured to an anchor sleeve, and wherein said anchor sleeve is configured and sized to fit within stake holes of said pickup truck.

6. The motorcycle rack of claim 4 wherein said lower cross-member of said frame further comprises a generally U-shaped lower support.

7. The motorcycle rack of claim 6 wherein said lower support is attached to said lower cross-member intermediate of said upright supports attached to said opposing terminal ends of said slot.

8. The motorcycle rack of claim 6 wherein said lower support further comprises a pair of adjustable tie-down straps with carabiners.

9. The motorcycle rack of claim 1 wherein said first lateral tire support and said second lateral tire support of said curved wheel wedge further comprise a plurality of spaced cross-members to maintain said first lateral tire support and said second lateral tire support in a consistent parallel and fixed spaced arc.

10. The motorcycle rack of claim 1 wherein said tongue of said wheel wedge is a rigid, planar tongue being horizontal to and perpendicular with said first lateral tire support and said second lateral tire support.

11. The motorcycle rack of claim 2 wherein said tongue further comprises a plurality of pin apertures, and said pin apertures of said tongue coaxially spaced and axially aligned with said pin apertures in said upper cross-member and said lower cross-member.

12. A motorcycle rack for a pickup truck, said motorcycle rack comprising:
   a frame, comprising:
      an upper cross-member and a lower cross-member aligned in a parallel and spaced relation forming a long, narrow slot there between, said upper cross-member and said lower cross-member having a plurality of axially aligned pin apertures for receipt of a fastening pin, said upper cross-member having a lower surface, said lower cross-member having an upper surface; and
      upright supports attached to terminal ends of said upper cross-member and said lower-cross member; and
   a curved wheel wedge, comprising:
      a pair of spaced lateral tire supports having extended lower ends; and
      a rigid planar tongue attached to said tire supports, said tongue being horizontal to perpendicular with said lateral tire supports, said tongue having a plurality of pin apertures for receipt of said fastening pin, said pin apertures of said tongue coaxially spaced and axially aligned with said pin apertures in said upper cross-member and said lower cross-member, said tongue of said curved wheel wedge adjustably received intermediate of said upper cross-member and said lower cross-member within said slot of said frame, said tongue having an upper surface engaged with said lower surface of said upper cross-member, said tongue having a lower surface engaged with said upper surface of said lower cross-member.

13. The motorcycle rack of claim 12 wherein said pin apertures in said upper cross-member and said lower cross-member further comprise a right set of pin apertures, a center set of pin apertures and a left set of pin apertures.

14. The motorcycle rack of claim 12 wherein said upright supports are inverted L-shaped upright supports, said upright supports comprising vertical support members having an upper terminal cantilevered support member, said vertical support members attached to opposing terminal ends of said slot.

15. The motorcycle rack of claim 14 wherein each of said cantilevered support members of said upright supports includes an elongate fastener aperture through which a fastener is vertically passed and secured to an anchor sleeve, and wherein said anchor sleeve is configured and sized to fit within stake holes of said pickup truck.

16. The motorcycle rack of claim 12 wherein said lower cross-member of said frame further comprises a generally U-shaped lower support attached to said lower cross-member intermediate of said upright supports.

17. The motorcycle rack of claim 16 wherein said lower support further comprises a pair of adjustable tie-down straps with carabiners.

18. The motorcycle rack of claim 12 wherein said tire supports further comprise a first lateral tire support aligned in a parallel and fixed spaced relation to a second lateral tire support, said first lateral tire support and said second lateral tire support being generally C-shaped with elongate, horizontally extending lower ends.

19. The motorcycle rack of claim 18 wherein said first lateral tire support and said second lateral tire support of said curved wheel wedge further comprise a plurality of spaced cross-members to maintain said first lateral tire support and said second lateral tire support in a consistent parallel and fixed spaced arc.

* * * * *